United States Patent
Araki et al.

(10) Patent No.: US 6,816,926 B2
(45) Date of Patent: Nov. 9, 2004

(54) STORAGE SYSTEM

(75) Inventors: Masanori Araki, Odawara (JP); Masatoshi Baba, Odawara (JP); Yuji Sueoka, Odawara (JP); Isamu Kurokawa, Odawara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/612,905

(22) Filed: Jul. 7, 2003

(65) Prior Publication Data
US 2004/0098542 A1 May 20, 2004

Related U.S. Application Data

(63) Continuation of application No. 10/403,277, filed on Apr. 1, 2003, now Pat. No. 6,721,823, which is a continuation of application No. 09/458,705, filed on Dec. 13, 1999, now Pat. No. 6,567,865.

(30) Foreign Application Priority Data

Dec. 16, 1998 (JP) .......................................... 10-357253

(51) Int. Cl.$^7$ ................................................ G06F 3/00
(52) U.S. Cl. ............................... 710/36; 710/5; 710/40; 709/213; 711/151; 711/152
(58) Field of Search ................................. 710/5, 36, 39, 710/40, 74; 709/200, 213; 711/100, 151, 152, 156, 4, 114

(56) References Cited

U.S. PATENT DOCUMENTS

| | | | |
|---|---|---|---|
| 5,394,539 A | 2/1995 | Neuhard et al. ............ 711/209 |
| 5,519,849 A | 5/1996 | Malan et al. ................ 711/114 |
| 5,644,786 A * | 7/1997 | Gallagher et al. ............ 710/30 |
| 5,913,224 A | 6/1999 | MacDonald ................. 711/725 |
| 5,974,502 A | 10/1999 | DeKoning et al. .......... 711/114 |
| 6,216,207 B1 | 4/2001 | Miller et al. ................. 711/113 |
| 6,427,184 B1 | 7/2002 | Kaneko et al. ................. 711/4 |
| 6,553,464 B1 * | 4/2003 | Kamvysselis et al. ....... 711/148 |
| 6,640,280 B1 * | 10/2003 | Kamvysselis et al. ....... 711/113 |
| 6,732,194 B1 * | 5/2004 | Kopylovitz et al. ........... 710/5 |

FOREIGN PATENT DOCUMENTS

| | | |
|---|---|---|
| JP | 1-15899 | 3/1989 |
| JP | 7-200179 | 8/1995 |

* cited by examiner

*Primary Examiner*—Jeffrey Gaffin
*Assistant Examiner*—Harold Kim
(74) *Attorney, Agent, or Firm*—Mattingly, Stanger & Malur, P.C.

(57) ABSTRACT

For using a plurality of files contained in one logical device with a plurality of processing systems, sharing of a data storage unit among the plurality of processing systems is realized without need for a host processing system to check use states of the files in a server storage unit. Information concerning extent (extent range) of an input/output processing request issued by a host processor is stored in a control memory incorporated in a control unit for allowing the control unit to make decision as to overlap of the extents of the input/output processings to thereby effectuate exclusive control on an extent-by-extent basis.

14 Claims, 7 Drawing Sheets

20 EXAMPLE OF DATA (CCW CHAIN) TRANSFERRED
FROM HOST PROCESSOR

CCW x'63'(Define Extent)   x'10C00000 00000000 <u>00100000</u> <u>0010000E</u>'
                                               (START)   (END
                                               EXTENT)   EXTENT)
x'47'(Locate Record) x'06000001 00100003 00100003 01FF0000'
x'06'(Read Data)

INPUT / OUTPUT PROCESSING CONTROL TABLE    40

303 — INPUT / OUTPUT PROCESSING CONTROL TABLE ID NUMBER

401 — EXTENT INFORMATION

402 — WAIT-EVENT OCCURRENCE TIME

403 — RECONNECTION-RELATING INFORMATION

FIG.5

PATH GROUP IDENTIFIER TABLE 50

| | |
|---|---|
| PATH IDENTIFIER 1 | PATH GROUP IDENTIFIER |
| PATH IDENTIFIER 2 | PATH GROUP IDENTIFIER |
| PATH IDENTIFIER 3 | PATH GROUP IDENTIFIER |
| ⋮ | ⋮ |
| PATH IDENTIFIER n–2 | PATH GROUP IDENTIFIER |
| PATH IDENTIFIER n–1 | PATH GROUP IDENTIFIER |
| PATH IDENTIFIER n | PATH GROUP IDENTIFIER |

EXTENT-BASED EXCLUSIVE-USE SUPPRESSION CONTROL TABLE 60

| | |
|---|---|
| LOGICAL DEVICE ID NUMBER 1 | EXTENT-BASED EXCLUSIVE-USE SUPPRESSION CONTROL INFORMATION |
| LOGICAL DEVICE ID NUMBER 2 | EXTENT-BASED EXCLUSIVE-USE SUPPRESSION CONTROL INFORMATION |
| LOGICAL DEVICE ID NUMBER 3 | EXTENT-BASED EXCLUSIVE-USE SUPPRESSION CONTROL INFORMATION |
| LOGICAL DEVICE ID NUMBER 4 | EXTENT-BASED EXCLUSIVE-USE SUPPRESSION CONTROL INFORMATION |
| ⋮ | ⋮ |

301 — 601

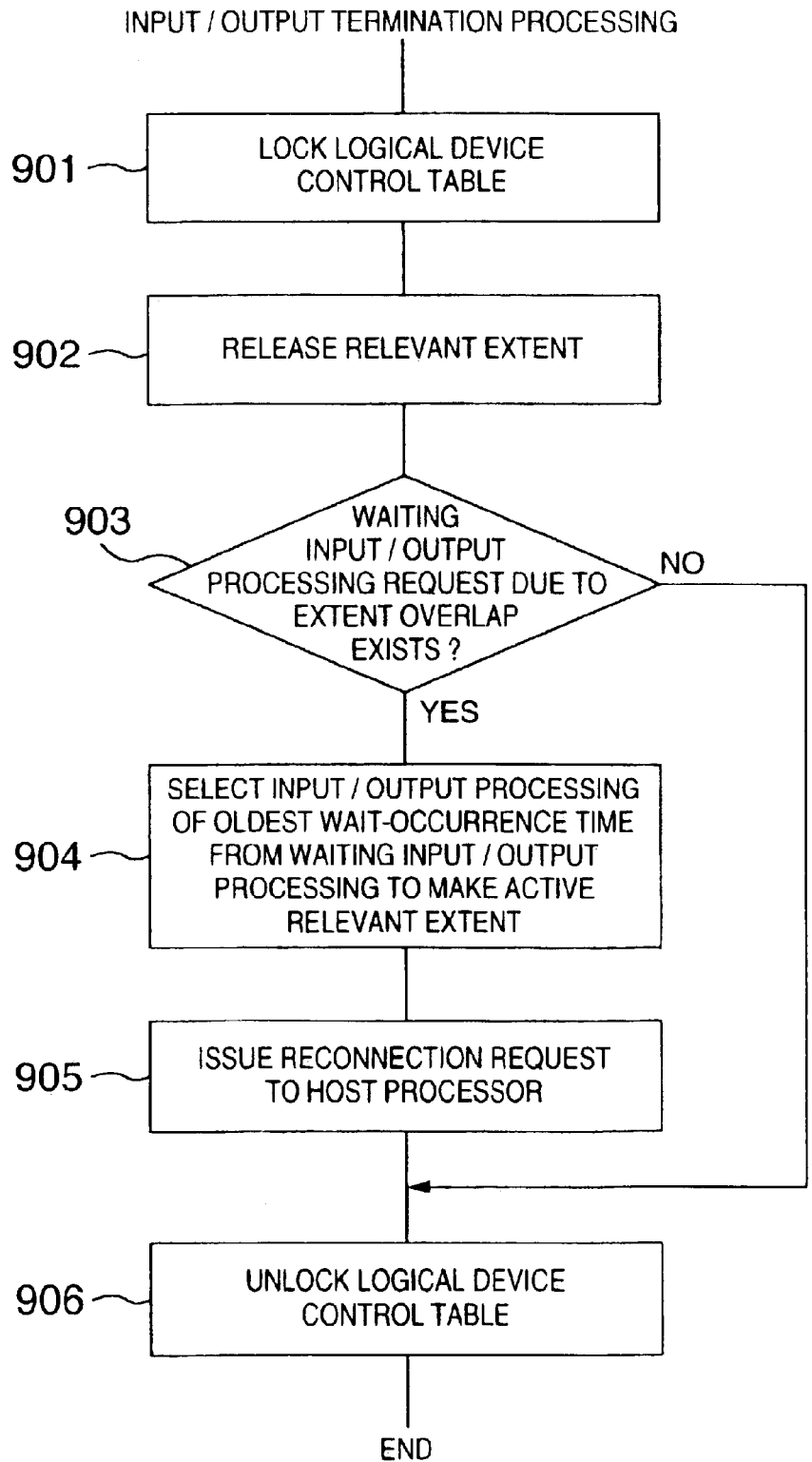

STORAGE SYSTEM

This is a continuation application of U.S. Ser. No. 10/403,277, filed Apr. 1, 2003, now U.S. Pat. No. 6,721,823; which is a continuation application of U.S. Ser. No. 09/458,705, filed Dec. 13, 1999, now U.S. Pat. No. 6,567,865.

BACKGROUND OF THE INVENTION

The present invention relates to a data storage system coupled or connected to a plurality of host processors. More particularly, the invention is concerned with a technology which can effectively be adopted for enhancing efficiency of exclusive control for the processing of stored data.

In general, there exist a plurality of files in one volume set up in a magnetic disk drive or device. When a file in a given volume is being used by a given host processor, the volume containing that file assumes a device busy state. As a result of this, access of other host processor to the other file contained in the given volume is forced to wait for releasing of the volume from the device busy state. This is because such exclusive use is effectuated that when one host processor is using one volume, any other host processor is disabled to use that volume.

With the access control scheme mentioned above, there arises a problem that when a plurality of files exist on a given volume, files other than that for which the exclusion is to be effectuated are unnecessarily subjected to the exclusion, which leads to degradation of file utilization efficiency. For solving the problem mentioned above, there has been proposed such approach that a control memory is provided in a magnetic disk control unit for storing information indicating on a file-by-file basis whether or not individual files are being used, wherein the use statuses of the files are checked by a host processor system by reading the above-mentioned information from the corresponding control memory, as disclosed, for example, in JP-B-1-15899. In the file access control scheme disclosed in JP-B-1-15899, the exclusive control is performed on a logical-file basis. Consequently, when sharing of a same file is desired, e.g. when a same file is to be shared by two host processors only for read operation, such sharing of the same file is impossible because of the exclusion on a file-by-file basis.

Further, JP-A-7-200179 discloses a scheme according to which a physical volume is partitioned into a plurality of subvolumes. With the volume management scheme disclosed in JP-A-7-200179, the exclusive control can be carried out on a subvolume basis. In that case, the subvolume itself has to be created upon formatting of the disk. Further, the exclusive control of the subvolumes is performed by the host processor by confirming or checking the use status of the subvolumes on the basis of information held by an external storage.

In the conventional systems described above, for effectuating the exclusive control on the basis of files contained in a physical volume or on a subvolume basis, it becomes necessary that the host processing system reads from the magnetic disk device the information indicating whether or not the files or subvolumes are being used, to thereby check whether the file or subvolume of concern is being used or not, which in turn means that the host processing has to be imparted with an especial function for the exclusive control. For realizing such exclusive control, alteration or modification of both host software and the server storage control unit becomes necessary.

SUMMARY OF THE INVENTION

In the light of the state of the art described above, it is an object of the present invention to provide a storage system which is capable of performing exclusive control of input/output processing requests on the basis of files (i.e., on a file-by-file basis) which are contained in a volume in the case where individual files contained in the volume are to be shared by a plurality of systems, without need for imparting to the host processing system and/or host software the function for checking whether the file or files stored in a server storage unit is being used or not.

In view of the above and other objects which will become apparent as the description proceeds, there is provided according to an aspect of the present invention a storage system which is comprised of a control unit incorporating a control memory, wherein information concerning the extent (range) of an input/output processing request (hereinafter also referred to as the input/output processing request extent) which is transferred from a given one of plural host processors to the control unit upon issuance of the input/output processing request from the former is stored in the control memory with a view to realizing the exclusive control for a plurality of input/output processing requests issued from a plurality of host processors to one logical device by making use of the extent information mentioned above. When an input/output processing request is newly issued, decision is made as to whether or not any input/output processing request whose extent overlaps with that of the newly issued input/output processing request is being executed. Unless overlap of the extents is found, the input/output processing as requested currently is executed continuously. On the other hand, when the extent overlap is found, the newly issued input/output processing request is stored in the control memory as the input/output processing request waiting for execution.

In the control memory incorporated in the control unit, identifiers defined inherently to the individual input/output processings (hereinafter referred to as the input/output processing request identifiers), respectively, and identifiers of paths by way of which the input/output processing requests are transferred to the control unit (hereinafter also referred to as the path identifiers) are stored on a request-by-request basis. The extent information of the individual input/output processing requests is stored in correspondence to the input/output processing request identifiers, respectively. Further, for the input/output processing request for which overlap of the extent is decided and which is thus forced to wait for execution, the information indicating occurrence of wait-event is stored in correspondence to the relevant input/output processing request identifier.

Furthermore, in the storage system according to the present invention, the wait-event occurrence information stored in the control memory is referred upon completion of the input/output processing for the preceding request. When the input/output request waiting for execution in succession to the preceding input/output processing request exists, a request for reconnection of the input/output processing awaiting the execution is issued to the host processor.

Besides, in a preferred mode for carrying out the present invention, service equipment having a function for transmitting information to the control memory incorporated in the control unit may be employed for allowing the control unit to inhibit the logical device from the aforementioned exclusive control on the extent-by-extent basis when it is indicated by the service equipment that the extent exclusive control on the logical-device basis is not to be performed.

The above and other objects, features and attendant advantages of the present invention will more easily be understood by reading the following description of the preferred embodiments thereof taken, only by way of example, in conjunction with the accompanying drawings, being appreciated that many modifications and variations of the present invention are possible in the light of the teachings disclosed herein.

BRIEF DESCRIPTION OF THE DRAWINGS

In the course of the description which follows, reference is made to the drawings, in which:

FIG. 5 is a view illustrating a structure of a path group identifier table stored in the control memories of the control unit;

FIG. 6 is a view illustrating a structure of an extent-based exclusive-use suppression control table stored in the control memories of the control unit;

FIG. 9 is a flow chart for illustrating a process for restarting an input/output processing request forced to wait for execution by the exclusive control according to the present invention.

DESCRIPTION OF THE EMBODIMENTS

Figure 1:
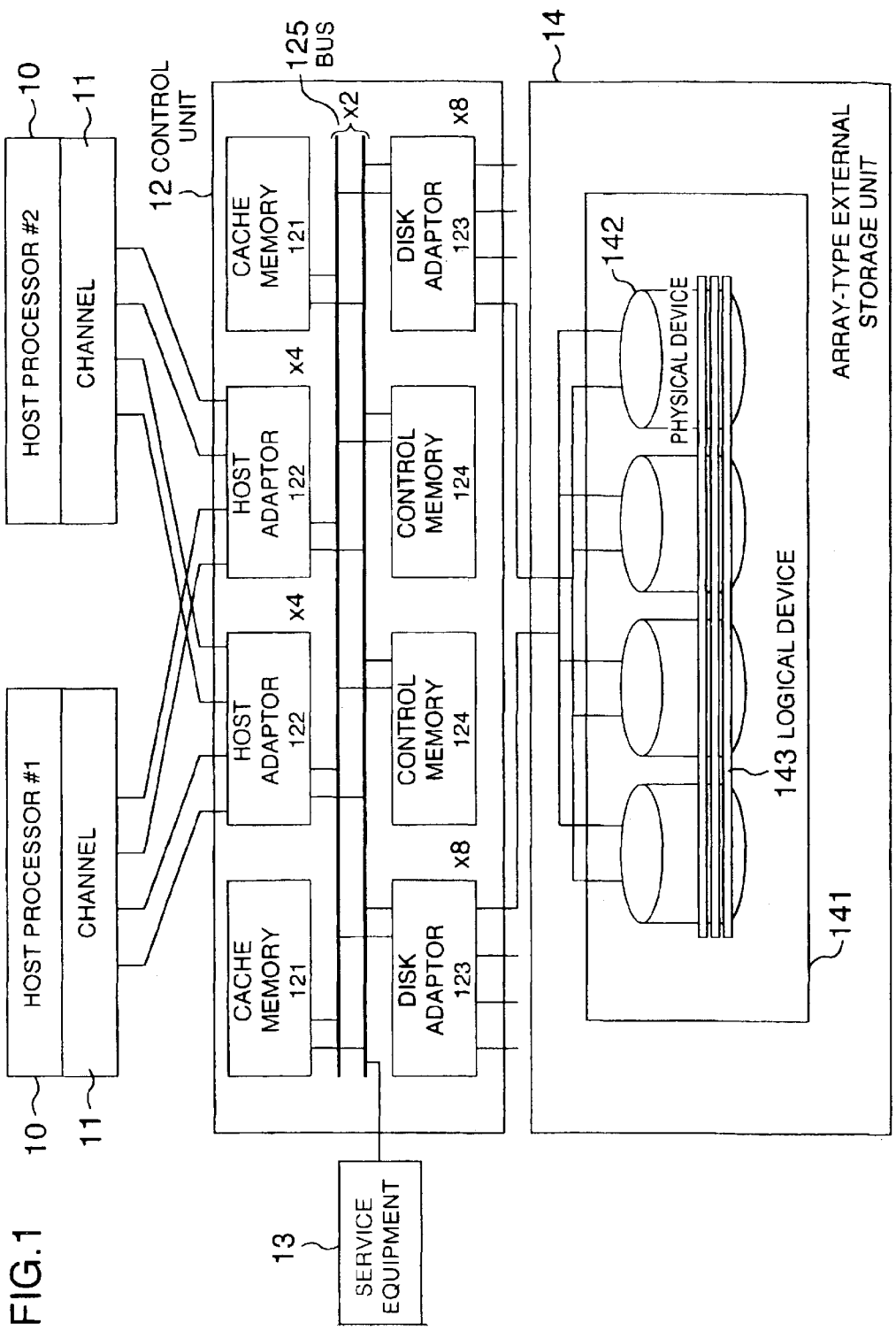
FIG. 1 is a block diagram showing schematically a general arrangement of a storage system according to an embodiment of the present invention.

The present invention will be described in detail in conjunction with what is presently considered as preferred or typical embodiments thereof by reference to the drawings. In the following description, like reference characters designate like or corresponding parts throughout the several views.

(A) General Arrangement of Storage System

Referring to FIG. 1, the storage system according to an embodiment of the present invention includes a plurality of host processors (#1, #2) 10 for performing arithmetic operations or the like by processing information or data, channels 11 for performing input/output control such as control of data transfer, an array-type external storage unit 14, and a control unit 12 which is in charge of controlling the components or units mentioned above. The storage system now under consideration is so arranged that read/write data operation for a logical device 143 set up in the array-type external storage unit 14 is carried out in response to a command issued by a given one of the host processors 10 by way of the relevant channel 11 and a relevant host adaptor 122, a cache memory 121 and a disk adaptor 123 which are incorporated in the control unit 12.

The control unit 12 incorporates therein control memories 124 which are adapted to store control information used for carrying out controls described hereinafter and is provided with service equipment 13 which serves for a function for transmitting external commands to the control memory 124. Each of the host adaptors 122 incorporated in the control unit 12 is designed to control the data transfer with the channels 11. On the other hand, each of the disk adaptors 123 also incorporated in the control unit 12 is designed to control the read/write data operation for the logical device or devices 143 set up over a plurality of physical devices 142 provided in the array-type external storage unit 14. The host adaptor 122 and the disk adaptor 123 perform read/write data operation for the cache memory 121. Thus, data transfer between the host adaptor 122 and the disk adaptor 123 can be realized through the medium of the cache memory 121. In the control memory 124, there is stored control information in the form of logical device control tables 30, input/output processing control tables 40, a path group identifier table 50 and an extent-based exclusive-use suppression control table 60, etc., which will be described in detail hereinafter. The host adaptors 122, the cache memories 121, the control memories 124 and the disk adaptors 123 are connected or coupled to buses 125, respectively, as can be seen in FIG. 1.

Now, description will be directed to operation in general of the system implemented in the configuration described above. In the read data operation, a read request issued from a given one of the host processors 10 is first received by the relevant host adaptor 122, whereupon the host adaptor 122 checks the cache memory 121 as to whether or not the data as required is available in the cache memory 121. In case the required data exists in the cache memory, the host adaptor 122 transfers the data to the relevant host processor 10 from the cache memory. On the other hand, unless the required data is available from the cache memory 121, the host adaptor 122 requests the disk adaptor 123 for reading the required data from the logical device 143 installed internally of the array-type external storage unit 14. After the disk adaptor 123 has stored once the required data in the cache memory 121, the host adaptor 122 transfers the required data to the host processor 10.

In the write data operation, a write request issued by a given one of the host processors 10 is received by the host adaptor 122 incorporated in the control unit 12. Subsequently, the host adaptor 122 writes the received data in the cache memory 121 and sends a write command end message indicating completion of the write request to the host processor 10. The disk adaptor 123 transfers the data stored temporarily in the cache memory to the logical device 143 to be written at a location indicated by the write request.

The array-type external storage unit 14 is constituted by a plurality of array groups 141, wherein each of the array groups is constituted by a plurality of physical devices 142. The logical devices 143 accessed by the host processor on a device-by-device basis are set up across a plurality of physical devices 142. By virtue of such arrangement, even when a plurality of processing requests are issued to one and the same logical device 143, these processing requests can be processed, respectively, by the relevant physical devices 142 in parallel, so long as the extents of the plural input/output processing requests are destined for the physical devices which differ from one another. Thus, the processing efficiency can be enhanced.

Figures 2, 4:
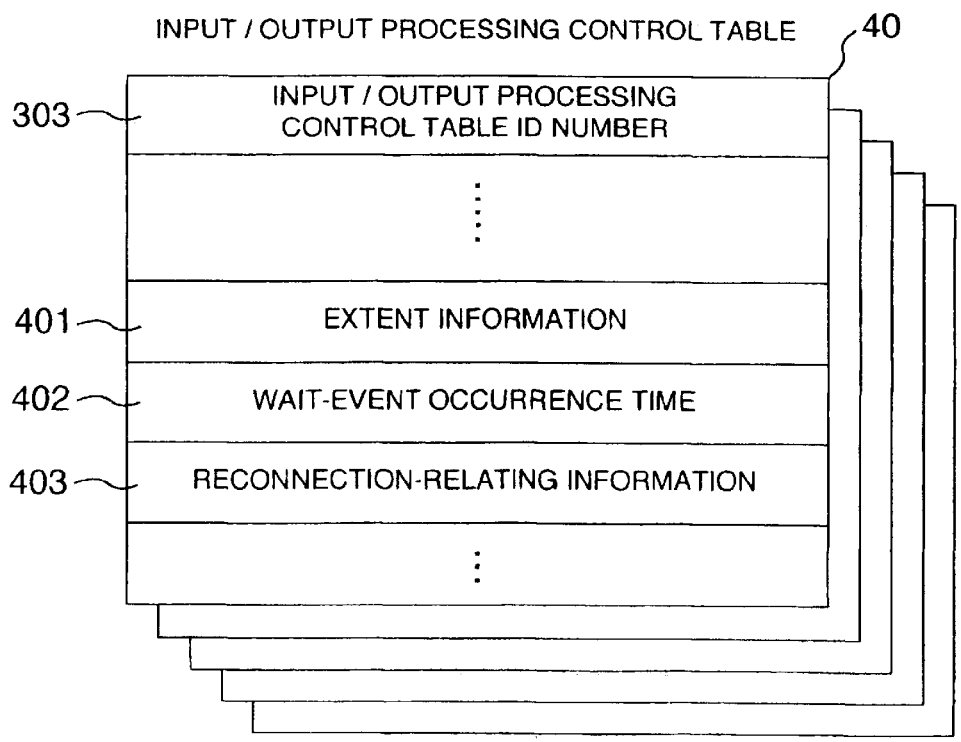
FIG. 2 is a view for illustrating, by way of example, commands transferred between host processors and a control unit.
FIG. 4 is a view illustrating a structure of input/output processing control tables stored in the control memories of the control unit.

FIG. 2 is a view for illustrating a heading or leading portion of a CCW chain (Channel Command Word chain) with which channel requests for reading data as an example of the instruction or commands and data groups transferred between the host processor 10 and the control unit 12 by way of the channel 11. Referring to FIG. 2, a command "Define Extent" serves for defining the range or extent of the input/output processing of a succeeding command, a cache access mode and the like. A command "Locate Record" validates or enables seek and search operations for a target or object record, while a command "Read Data" designates read operation of the relevant data. The extent information designated by the command "Define Extent" has heretofore been used for rejecting the execution in case the succeeding input/output command is out of the range or extent. By contrast, according to the teachings of the present invention, the extent information is stored in the control memory 124 for the exclusive control, which will be described later on.

(B) Logical Device Control Information Stored in Control Memory of Control Unit

Figure 3:
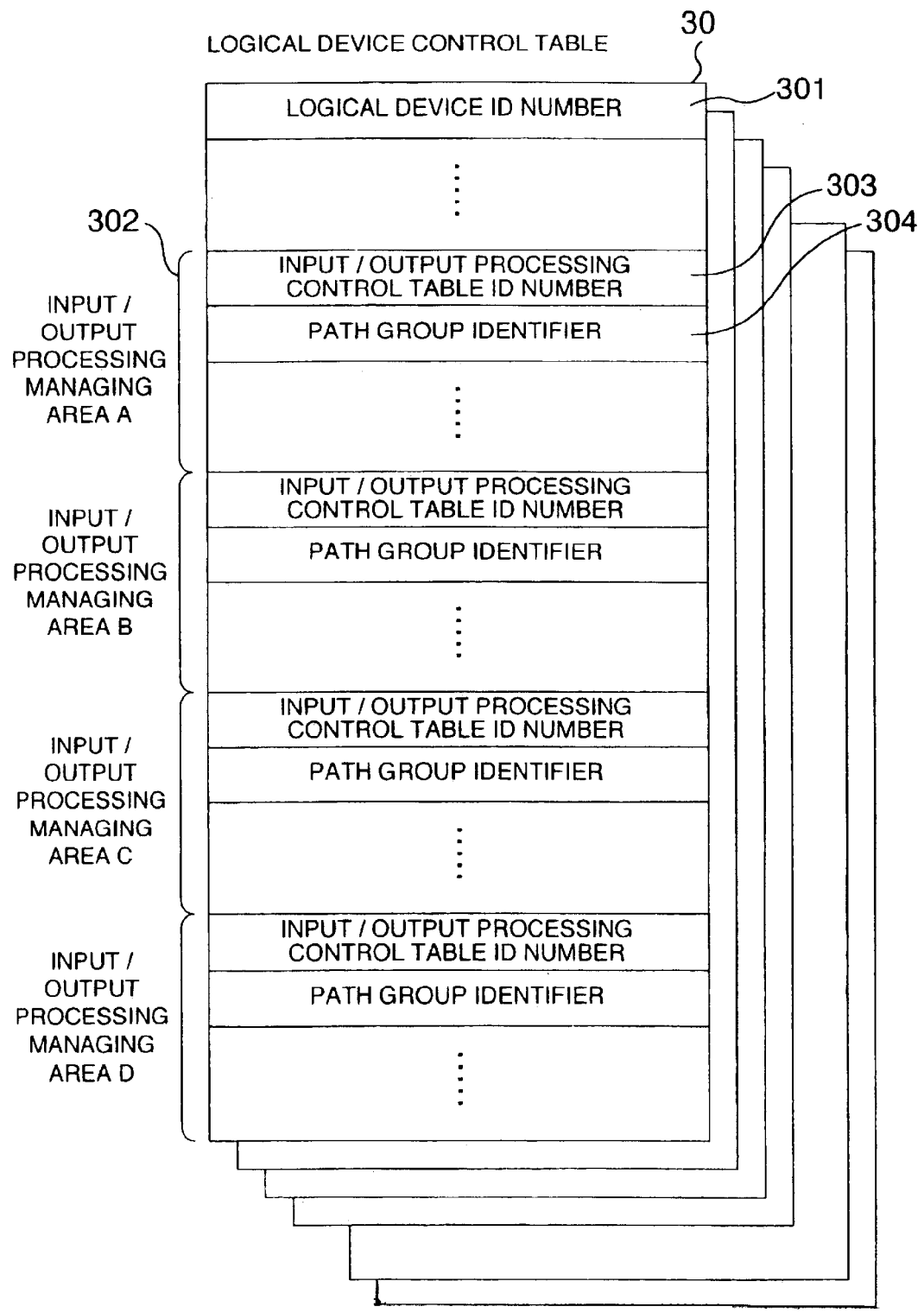
FIG. 3 is a view illustrating a structure of logical device control tables stored in control memories of a control unit in the storage system according to an embodiment of the present invention.

FIG. 3 is a view for illustrating logical device control tables 30 stored in the control memories 124 incorporated in the control unit 12 in the system according to the present invention. The number of the logical device control tables 30 as provided may be equal to that of the logical devices 143 controlled by the control unit 12, wherein each of the logical device control tables is affixed with a logical device ID number 301 as the identifier for identifying the relevant logical device.

Upon issuance of an input/output processing request from a given one of the host processors 10, an input/output processing managing area 302 is allocated to the logical device control table relevant to the input/output processing as requested. For identifying the input/output processing, relevant one of the input/output processings is assigned with the input/output processing control table ID number 303 which is then stored in the input/output processing managing area 302. Additionally, for identifying discriminatively the host processor which executed the input/output processing, there is stored in the relevant logical device control table (30) a path group identifier or identifiers 304 prescribed by the relevant host processor 10 for one or plural path sets intervening between the individual host processors 10 and the control unit.

(C) Input/Output Processing Control Information Stored in Control Memory of Control Unit FIG. 4 is a view showing input/output processing control tables 40 designed for storing individual information of the input/output processings, respectively, which are requested for the control unit 12. Each of the input/output processing control tables 40 is affixed with the input/output processing control table ID number 303 as an identifier for identifying the input/output processing. The input/output processing control table ID number corresponds to the input/output processing control table ID number 303 shown in FIG. 2. Stored in each of the input/output processing control tables 40 is the extent information 401 which is based on the command "Define Extent" sent from the host processor 10.

The extent information 401 contains a start address and an end address of the relevant logical device determined on the basis of the extent of the input/output processing request designated by the command "Define Extent", to thereby define the extent of the logical device over which the input/output processing is to be performed. The control unit of the storage system according to the present invention is so designed or programmed as to perform the exclusive control on the basis of the extent information 401. Consequently, when the extent information 401 of a given input/output processing overlaps with that of the other input/output processing which is being currently executed, the given input/output processing is forced to wait for the start of execution thereof, which is referred to as occurrence of wait event. In this case, information concerning the relevant wait-event occurrence time 402 is stored in the input/output processing control table.

Further, upon execution of the input/output processing requested by the host processor 10, decision is made as to whether this processing is activated initially or it has been forced to wait for execution by the exclusive control and is executed by restarting. To this end, there is provided the reconnection-relating information 403 in which information indicating the reconnection is set when execution of an input/output processing is to be restarted from the waiting state.

(D) Path Group Identifier Information Stored in Control Memory of Control Unit

FIG. 5 is a view illustrating a structure of the path group identifier table 50 for acquiring the path group identifier to thereby determine in which of the host processors the input/output processing request issued to the control unit originates. The path group identifier table 50 is resident in the control memory 124 incorporated in the control unit. More specifically, a number of areas equal to that of the paths which interconnect the control unit and the host processors are provided on the control memory 124, wherein one path group identifier 304 can definitely be identified by one path identifier 501. To say in another way, one-to-one correspondences are established between the path identifiers and the path group identifiers, respectively.

(E) Extent-Based Exclusive-Use Suppression Control Information Stored in Control Memory of Control Unit FIG. 6 is a view for illustrating a structure of the extent-based exclusive-use bypass or suppression control table 60 which table is referred to when the exclusive control is to be suppressed or bypassed on a logical-device basis due to the extent designated by the service equipment 13 or by the command of the host processor. The extent-based exclusive-use suppression control tables 60 are prepared in a number equal to that of the logical device ID numbers 301. When the extent-based exclusive use is to be suppressed, information indicating the suppression is set in the relevant extent-based exclusive-use suppression control information 601.

(F) Extent-Based Exclusive Control Operation

Figure 7:
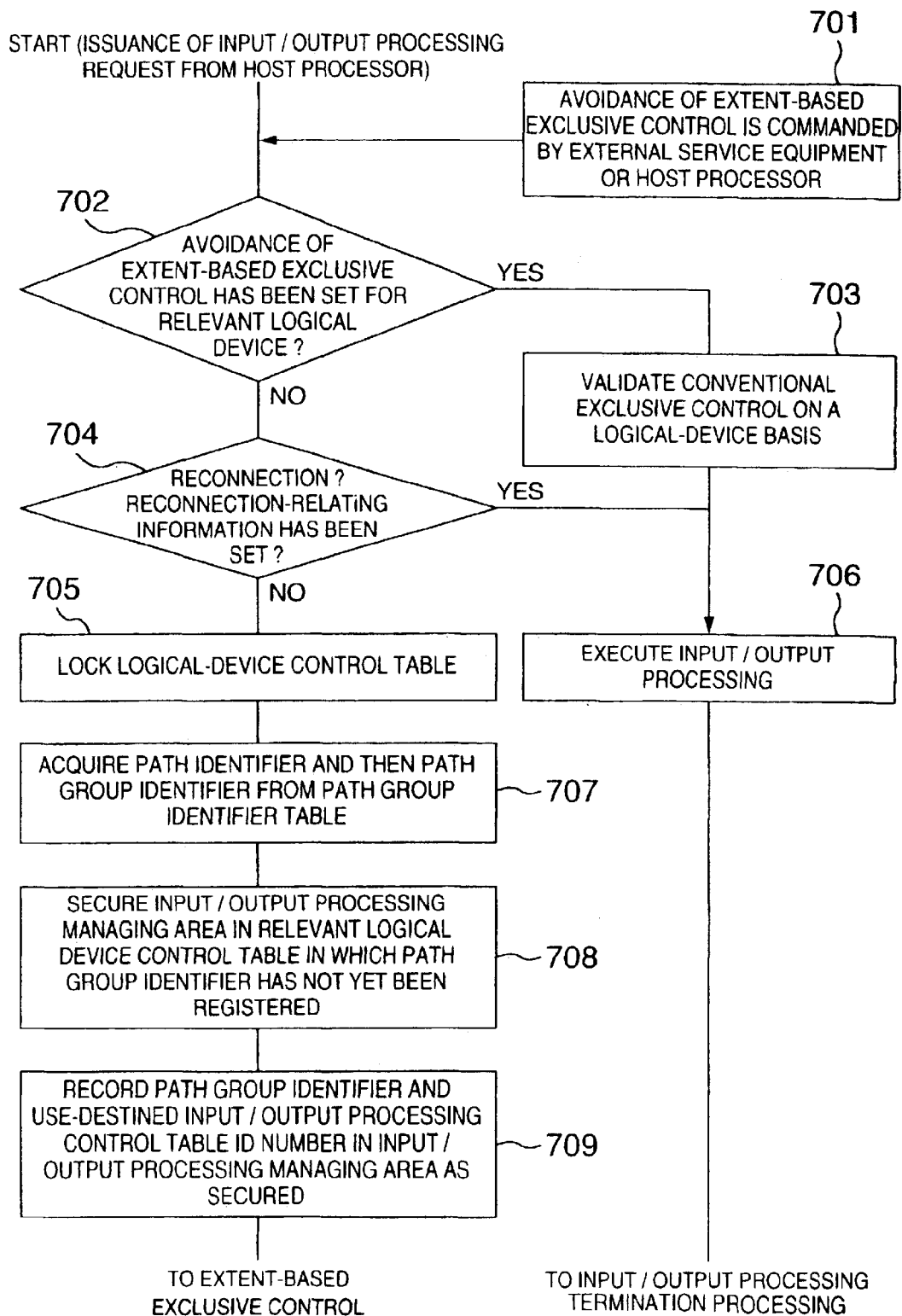
FIG. 7 is a flow chart for illustrating a processing procedure executed according to the teachings of the invention in case an input/output processing request containing extent information is issued.
Figure 8:
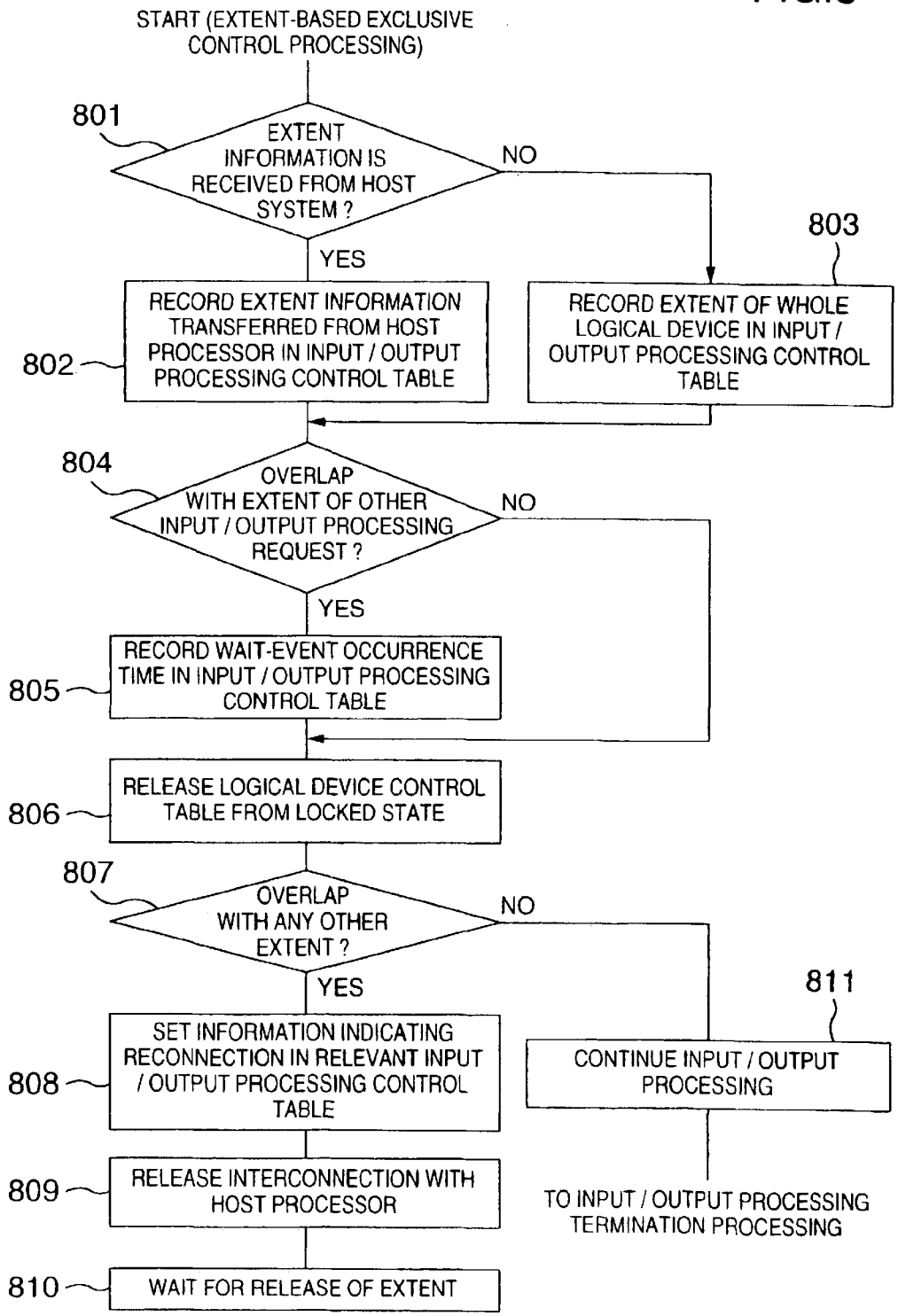
FIG. 8 is a flow chart for illustrating a processing procedure for executing an extent-based exclusive control according to the present invention.

FIGS. 7 to 9 are flow charts for illustrating the exclusive control performed on an extent-by-extent basis upon reception of commands for plural input/output processings for one volume from plural host processors by the host adaptors 122.

More specifically, FIG. 7 is a flow chart for illustrating a processing procedure executed when a command for input/output processing is received by the host adaptor 122 from the host processor.

If an extent exclusive control is not suppressed by a service equipment or a host, upon issuance of the input/output processing request from a given one of the host processors, decision is made in a step 702 as to whether or not the extent-based exclusive-use suppression control information 601 indicating that the exclusive control taught by the present invention is to be evaded or suppressed for the logical device to which the input/output processing request mentioned above is directed has been set in the extent-based exclusive-use suppression control table 60 stored in the control memory 124 of the control unit by the external service equipment or by other host processor. When bypassing or avoidance of the exclusive control is set, the processing proceeds to a step 703, whereupon the exclusive control is performed on a logical-device basis as in the case of the conventional techniques described hereinbefore, for thereby allowing the input/output processing as requested to be executed continuously (step 706). On the other hand, unless the bypassing or avoidance of the exclusive control is set, the processing proceeds to a step 704. In this step 704, it is decided whether the input/output processing request mentioned above is validated by the reconnection or activated initially. The above decision can be made on the basis of the reconnection-relating information 403 contained in the input/output processing control table 40 which is stored in the control memory 124 of the control unit. In case the input/output processing request is activated by the reconnection, the processing proceeds to a step 706 to continue execution of the input/output processing.

On the other hand, when the input/output processing request is the one activated initially, the logical device control table 30 is locked in a step 705, which is then followed by a step 707 where the relevant path group identifier is acquired by referring to the path group identifier table 50 with the path identifier of the activating path. In succession, in a step 708, the input/output processing managing area 302 of the logical device control table 30 for the relevant logical device in which the path group identifier 304 is not registered is searched to thereby secure the input/output processing managing area 302 in which the path group identifier has not yet been registered. In a step 709, the path group identifier 304 and the input/output processing control table ID number 303 capable of identifying the input/output processing are recorded to be used as the information for making decision as to which of the host processors the input/output processing request now concerned originates in.

FIG. 8 is a flow chart for illustrating a processing procedure for executing the extent-based exclusive control by storing the information concerning the extent (i.e., extent information) of the input/output processing request received from a host processor in the input/output processing control table 40 prepared on the control memory 124 and by making decision as to the overlap of the extent with that of other input/output processing. Referring to the figure, decision is made in a step 801 as to whether or not the input/output processing request transferred from the host processor contains information concerning the extent (extent information). When the extent information is transferred, the transferred extent information is recorded as the extent information 401 of the relevant input/output processing control table ID number 303 stored in the logical device control table 30 (step 802). On the other hand, when no extent information is available, the start address and the end address of the relevant logical device are recorded as the extent information 401, whereupon the exclusive control is executed with the whole volume being regarded as one extent (step 803).

Subsequently, in a step 804, decision is made for the relevant logical device whether or not the extent information 401 of the input/output processing to be executed overlaps with the extent information 401 for the other input/output processing request. When overlap is found, information of the wait-event occurrence time 402 is recorded in the input/output processing control table 40 for the processing which is forced to wait for (step 805), whereon the logical device control table 30 is released from the locked state in a step 806. Unless overlap is found, the logical device control table 30 is immediately unlocked in the step 806.

When the overlap is determined in a step 807, the reconnection-relating information 403 is set in the input/output processing control table 40 in a step 808, whereon interconnection with the host processor is cleared in a step 809. Then, the extent-release awaiting state is validated until the reconnection request is issued with the relevant extent being released (step 810). By contrast, when no overlap is decided in the step 807, the input/output processing is executed in a step 811.

In case-the input/output processing command is a read data command, then, data is read out from the cache memory when the data which overs the range of the input/output processing request is resident on the cache memory. By contrast, unless the data covering the range or extent of the input/output processing request is available from the cache memory, the data is read out from the arrayrtype external storage unit 14. Upon completion of the input/output processing (read processing in this case), the procedure proceeds to the input/output termination processing. By virtue of the exclusive control based on the extent information according to the present invention, a plurality of input/output processings can be executed for one and the same logical device so long as no overlap occurs in respect to the extent. Further, when these plural input/output processings are to be executed for the mutually different logical devices and when relevant data is unavailable from the cache memory (cache miss event) the data reading from the plural physical devices of the array-type external storage can be executed in parallel. However, when the physical devices are being used for executing the input/output processing for the same logical device or for the other logical device, the device-busy state is set.

In case the input/output processing command is a write command, data covered by the range or extent of the input/output processing request is written in the cache memory. Thereafter, the data is written in the logical device by the control unit, being transferred from the cache memory. Upon completion of the input/output processing, the procedure proceeds to the input/output termination processing.

FIG. 9 is a flow chart for illustrating the processings involved when the input/output processing procedure is terminated through the host adaptor 122. In a step 901, the logical device control table 30 is locked, which is then followed by a step 902 where the path group identifier 304 set in the relevant input/output processing managing area 302 is deleted for thereby allowing the relevant extent to be released.

In a step 903, for the logical device for which the input/output processing is to be terminated, decision is made as to presence of the input/output processing which is in the waiting state because of overlap of the extent with that of the input/output processing to be terminated through comparison with the extent information 401 placed in the input/output processing control table 40 corresponding to the other input/output managing area for the logical device mentioned above and by checking whether or not the wait-event occurrence time 402 is stored. Unless the wait-event occurrence time 402 is recorded in the input/output processing control table 40 or unless overlap of the extent occurs even when the wait-event occurrence time is recorded, the logical device control table 30 is released from the locked state in a step 906, whereupon the processing procedure comes to an end.

In case the wait-event occurrence time 402 is stored and when the input/output processing control table 40 for which the extent overlap with the input/output processing to be terminated exists, one of the input/output processing control tables in which the wait-event occurrence time 402 is oldest is selected in a step 904 for allowing the input/output processing managing area 302 of the selected input/output processing control table 40 to be made active. In a step 905, the host processor to be reconnected is specified on the basis of the path group identifier 304 placed in the corresponding input/output processing managing area 302 corresponding to the selected input/output processing control table 40, whereupon request for reconnection is issued to the specified host processor while the logical device control table 30 is released from the locked state in a step 906. Subsequently, the input/output processing activated through the reconnection is executed in succussion.

(G) Avoidance of Extent Exclusive Control

When avoidance of the exclusive control on the extent-by-extent basis described previously is commanded by the service equipment having the function for performing input/output operation on the control memory 124 of the control unit or designated by the control information sent to the control unit from the host processor, the extent-based exclusive control is not carried out for the logical volumes designated by the command. In that case, the input/output processing is performed in accordance with the conventional logic.

As will now be appreciated from the foregoing description, in the storage system according to the present invention, exclusive control for plural input/output processing requests issued for one logical device from the host processors is performed on the basis of the range or extent of the input/output processing requests. By virtue of this feature, when the relevant data exists on the cache memory of the control unit and thus the access to the physical device is unnecessary or when access is made to the data on one and the same logical device set up over the different physical devices of the array-type external storage unit, efficiency of data input/output operation can be enhanced surprisingly, whereby throughput of the system as a whole can be improved significantly.

What is claimed is:

1. A system comprising:
    a plurality of storage devices; and
    a control unit for controlling read/write of data requested by a plurality of host processors into the plurality of storage devices, using a plurality of logical storage areas constituted by storage areas of the plurality of storage devices,
    wherein, when the control unit receives I/O requests from multiple host processors for the same logical storage area, the I/O requests are handled in parallel if the control unit determines that there is no extent conflict between the I/O requests.

2. The system according to claim 1, wherein the control unit includes a plurality of host adaptors which control data transfer between the control unit and the plurality of storage devices.

3. The system according to claim 2, wherein the control unit includes a plurality of disk adaptors which control the read/write of data from/to the plurality of logical storage areas.

4. The system according to claim 3, wherein the control unit includes cache memories which enable the transfer of data between the host adaptors and the disk adaptors.

5. The system according to claim 1, wherein the control unit includes a plurality of disk adaptors which control the read/write of data from/to the plurality of logical storage areas.

6. The system according to claim 1, wherein the control unit includes a control memory which stores control information into a plurality of tables.

7. The system according to claim 1, wherein the control unit is designed to perform exclusive control over the I/O requests based upon their extents, their extents being defined by a start address and an end address of said same logical device.

8. A system comprising:
    a plurality of storage devices; and
    a control unit for controlling read/write of data requested by a plurality of host processors into the plurality of storage devices, using a plurality of logical storage areas constituted by storage areas of the plurality of storage devices,
    wherein, when the control unit receives I/O requests from multiple host processors for the same logical storage area, the I/O requests are not handled in parallel if the control unit determines that there is an extent conflict between the I/O requests.

9. The system according to claim 8, wherein the control unit includes a plurality of host adaptors which control data transfer between the control unit and the plurality of storage devices.

10. The system according to claim 9, wherein the control unit includes plurality of disk adaptors which control the read/write of data from/to the plurality of logical storage areas.

11. The system according to claim 10, wherein the control unit includes cache memories which enable the transfer of data between the host adaptors and the disk adaptors.

12. The system according to claim 8, wherein the control unit includes a plurality of disk adaptors which control the read/write of data from/to the plurality of logical storage areas.

13. The system according to claim 8, wherein the control unit includes a control memory which stores control information into a plurality of tables.

14. The system according to claim 8, wherein the control unit is designed to perform exclusive control over the I/O requests based upon their extents, their extents being defined by a start address and an end address of said same logical device.

* * * * *